(12) United States Patent
Martin et al.

(10) Patent No.: US 8,466,407 B2
(45) Date of Patent: Jun. 18, 2013

(54) STRAY LIGHT BAFFLES FOR A CONFORMAL DOME WITH ARCH CORRECTOR OPTICS

(75) Inventors: Chadwick B. Martin, Tucson, AZ (US); David J. Knapp, Tucson, AZ (US); Richard A. Funk, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 345 days.

(21) Appl. No.: 12/900,193

(22) Filed: Oct. 7, 2010

(65) Prior Publication Data
US 2012/0085895 A1      Apr. 12, 2012

(51) Int. Cl.
*H01J 3/14*      (2006.01)
*G01J 1/04*      (2006.01)

(52) U.S. Cl.
USPC ................................ 250/216; 250/237 R (58) Field of Classification Search
USPC ............ 250/216, 239, 234, 236, 237 R, 221, 250/229; 359/209.1, 210.1, 210.2, 221.2, 359/221.3, 708, 712, 811, 822, 726, 642, 359/648, 711, 727, 728, 731, 729, 725, 637, 359/813, 554, 894, 511; 244/3.17, 3.1, 3.16; 356/4.01, 139.05, 139.06, 139.04, 18
See application file for complete search history.

(56) References Cited

U.S. PATENT DOCUMENTS

| | | | | |
|---|---|---|---|---|
| 2,823,612 | A * | 2/1958 | Cox et al. | 244/3.16 |
| 4,106,856 | A * | 8/1978 | Babish | 359/602 |
| 6,028,712 | A | 2/2000 | McKenney | |
| 6,310,730 | B1 | 10/2001 | Knapp | |
| 6,356,396 | B1 * | 3/2002 | Chen et al. | 359/711 |
| 6,462,889 | B1 | 10/2002 | Jackson | |
| 6,552,318 | B1 | 4/2003 | Crowther | |
| 6,779,753 | B2 * | 8/2004 | Baumann et al. | 244/3.16 |
| 7,762,677 | B2 * | 7/2010 | Lundgren | 359/613 |
| 2009/0097124 | A1 | 4/2009 | Lundgren | |
| 2010/0127113 | A1 | 5/2010 | Taylor | |

FOREIGN PATENT DOCUMENTS

WO         99/18455 A1      4/1999

* cited by examiner

*Primary Examiner* — Que T Le
*Assistant Examiner* — Jennifer Bennett
(74) *Attorney, Agent, or Firm* — Eric A Gifford (57) ABSTRACT

Asymmetric rotating stray light baffles are provided for conformal dome two-axis seekers having arch corrector optics mounted on the outer gimbal. A pair of side skirt baffles are mounted on opposite sides of the arch corrector optics on the outer gimbal extending forward beyond the transparent arch adjacent but not touching the inner surface of the dome and extending aft beyond the forward most receiver optic for all fields of regard (FOR). The optical system may also include: (a) an annular objective baffle mounted on and around the receiver optics on the inner gimbal and between the pair of side skirt baffles, the objective baffle extending forward of the receiver optics without interfering with the receiver optics' FOV and without interfering with the transparent arch as the inner gimbal rotates, (b) a plurality of fin baffles mounted between the side skirt baffles on the outer gimbal that extend forward adjacent but not touching the inner surface of the dome and aft of the transparent arch, each fin baffle positioned to reduce the cross-section seen by the receiver optic when rotated in the direction of that fin baffle and (c) central baffles (short or long) along the axis of symmetry that obscure a portion of the receiver optics' FOV at a zero degree angle of rotation about the second axis.

20 Claims, 12 Drawing Sheets

STRAY LIGHT BAFFLES FOR A CONFORMAL DOME WITH ARCH CORRECTOR OPTICS

BACKGROUND OF THE INVENTION

1. Field of the Invention

This invention relates to baffling of stray light in a conformal (non-spherical) dome to prevent its entry into the aperture of the receiver optics and sensor, and, more particularly, the baffling of stray light in a conformal optic two-axis seeker provided with arch corrector optics mounted on the outer gimbal.

2. Description of the Related Art

An optical system includes an optical train with a sensor that receives radiated energy from a scene and converts it to an electrical signal. The electrical signal is processed to compute a guidance command, provided to a display or further processed for automated pattern recognition. The sensor is fragile and is easily damaged by dirt, erosion, chemicals, or high air velocity. In some systems the optical trains are fixed in orientation, and others the optical trains are mounted on gimbals that rotate to allow sensing over a wide angular field of regard.

In service, the sensor is placed behind a transparent, flat or dome-shaped window through which it views the scene and which protects the sensor from such external effects. If the dome-shaped window is non-spherical, highly curved, or thick, the window may introduce significant wavefront aberration into the optical rays that pass through it on the way to the sensor. These domes are typically referred to as a "conformal" dome, window or optic. Conformal domes present significant advantage in aerodynamic performance while presenting greater optical challenges. As discussed in U.S. Pat. No. 6,028,712, a transparent optical corrector having a shape responsive to the shape of the dome may be placed on the outer gimbal in the optical path between the conformal dome and the sensor to compensate for the aberrations introduced by the non-spherical window.

Reflections from one or more surfaces of transparent material may introduce stray light rays into the optical system that are unrelated to the scene light rays that are the subject of interest. In the optical system, the stray light rays, if reflected into the aperture of the receiver optics and to the sensor, may be misinterpreted as having come from the scene, may obscure the scene, or may blind the sensor if sufficiently strong. One particularly troublesome source of stray light rays is the sun. Even after the light rays of the sun are reflected multiple times, they may still be orders of magnitude brighter than objects of interest in the scene.

U.S. Pat. No. 6,462,889 discloses rotationally symmetric stationary optical baffles to reduce stray light rays that are reflected into a fixed optical train. At least one light baffle is positioned in the optical path between the outer dome and the sensor system and is fixed in space relative to the central axis. There are typically from one to three baffles, each affixed to either the inter surface of the outer dome or to the optical corrector. Each baffle is a frustoconical tube that is rotationally symmetric about the central axis. A set of fins may be supported on one of the baffles, with each fin extending radially outwardly from an outer surface of the baffle and parallel to the central axis.

U.S. Pat. No. 6,028,712, which is hereby incorporated by reference, discloses an optical corrector for gimbal-mounted optical trains. The optical system includes a housing having an axis of elongation (e.g. the central axis), and a non-spherical window affixed to the housing. An optical corrector, preferably in the form of an aspherical strip of transparent material, is positioned adjacent to the curved inner surface of the window. The optical corrector is mounted on an optical corrector support, which is rotatable about the axis of elongation (e.g. the roll axis which is coincident with the central axis). An optical train is positioned such the optical corrector lies between the window and the optical train. The optical train includes at least one optical element operable to alter an optical ray incident thereon, and a gimbal upon which at least one optical element is mounted. The gimbal is pivotable about a transverse axis (e.g. the nod axis) perpendicular to the axis of elongation (the roll axis). The optical train is mounted on an optical train support, which is movable independently of the optical corrector support. A sensor is positioned to receive the optical ray passing sequentially through the window, the optical corrector, and the optical train. The described optical corrector is hereafter referred to as an "arch corrector". The arch corrector is suitably used with a conformal dome roll/nod seeker.

U.S. Pat. No. 6,310,730, which is hereby incorporated by reference, discloses an optical corrector for gimbal-mounted optical trains. The optical system includes a curved window, an asymmetric, scoop-shaped optical corrector adjacent to a curved inner surface of the window, an optical train positioned such that the optical corrector lies between the curved window and the optical train, a movable optical train support upon which the optical train is mounted, and a sensor disposed to receive an optical ray passing sequentially through the window, the optical corrector, and the optical train. The optical corrector has an inner surface and an outer surface, at least one of which has a shape defined by an asymmetric polynomial. The described optical corrector is hereafter referred to as a "half-arch corrector". The scoop-shaped optical corrector may be mounted on a roll gimbal to rotate about the roll axis. At least the forward most receiver optic of the optical train rotates about a nod axis such that the optical corrector remains in the optical path between the window and the forward most optic. The "half-arch" corrector is lighter weight than the "arch" corrector but requires the optical train to roll more to cover the same field of regard (FOR).

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides asymmetric rotating stray light baffles for conformal dome two-axis seekers such as roll/nod or Az/El provided with arch corrector optics mounted on the outer gimbal. The arch corrector optics may comprise "arch", "half-arch" or "dual-arch" correctors. The stray light baffles reduce the amount of stray light incident on the aperture of the receiver optics and coupled to the sensor with minimal interference of scene light over the wide angular field of regard.

In an embodiment, an optical system comprises a non-spherical dome that is symmetric about an axis of symmetry. A two-axis seeker comprises an outer gimbal that rotates around a first axis that is coincident with the axis of symmetry, an inner gimbal on the outer gimbal that rotates around a second axis orthogonal to the first axis at the gimbal center to point an optical axis in a multi-dimensional space defined by said first and second axes, receiver optics on the inner gimbal that receive optical radiation in a field-of-view (FOV) along the optical axis and a sensor optically coupled to the receiver optics. An optical corrector comprising an aspheric transparent arch having an optical corrector shape responsive to a shape of the dome is mounted on the outer gimbal within an optical path between the dome and the receiver optics as the seeker rotates about its axes. The optical system includes a pair of side skirt baffles mounted on opposite sides of the transparent arch on the outer gimbal to at least cover the sides of the arch. The side skirt baffles suitably extending forward beyond the transparent arch adjacent but not touching the inner surface of the dome and extending aft beyond the forward most receiver optic for all fields of regard (FOR) and may be attached to opposite sides of the arch. Side skirt baffles preferably do not obscure the FOV at any direction in the FOR.

The optical system may also include one or more of the following: (a) an annular objective baffle mounted on and around the receiver optics on the inner gimbal and between the pair of side skirt baffles, the objective baffle extending forward of the receiver optics without interfering with the receiver optics' FOV and without interfering with the transparent arch as the inner gimbal rotates, (b) a plurality of fin baffles mounted between the side skirt baffles on the outer gimbal that extend forward adjacent but not touching the inner surface of the dome and aft of the transparent arch(es), each fin baffle positioned to reduce the cross-section seen by the receiver optic when rotated in the direction of that fin baffle and (c) central baffles (short or long) along the axis of symmetry that obscure a portion of the receiver optics' aperture when aligned or nearly aligned with the first axis.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 2a-2c are side, bottom and end-on views of an embodiment of side skirt baffles mounted on the roll gimbal on either side of the arch corrector optics just outside the seeker FOV for all nod FOR;

DETAILED DESCRIPTION OF THE INVENTION

The present invention provides asymmetric rotating stray light baffles for conformal dome two-axis seekers such as roll/nod or Az/El provided with arch corrector optics mounted on the outer gimbal. The conformal dome has an axis of symmetry that is coincident with the outer gimbal axis. This insures that the optical path is identical for all rotation positions of the outer gimbal. The arch corrector optics may comprise "arch", "half-arch" or "multi-arch" correctors. The stray light baffles reduce the amount of stray light incident on the aperture of the receiver optics and coupled to the sensor with minimal interference of scene light over the wide angular field of regard. The conformal dome may be mounted on various platforms such as missiles, airplanes, and helicopters and may be mounted forward, aft, sideways or on the belly of the platform. The axis of symmetry of the dome may be coincident with or orthogonal to a long axis of the platform.

In general, an optical system for mounting onto such a platform comprises a non-spherical dome that is symmetric about an axis of symmetry. A two-axis seeker such as a roll/nod or Az/El positioned behind the dome comprises an outer gimbal that rotates around a first axis that is coincident with the axis of symmetry, an inner gimbal on the outer gimbal that rotates around a second axis orthogonal to the first axis at the gimbal center to point an optical axis in a multi-dimensional space defined by said first and second axes, receiver optics on the inner gimbal that receive optical radiation in a field-of-view (FOV) along the optical axis and a sensor optically coupled to the receiver optics. An optical corrector comprising an aspheric transparent arch having an optical corrector shape responsive to a shape of the dome is mounted on the outer gimbal within an optical path between the dome and the receiver optics as the seeker slews. As the arch rotates with the outer gimbal, the transparent arch is suitably designed to just cover the FOR over all allowed rotations of the inner gimbal. The optical corrector may comprise "arch", "half-arch" or "multi-arch" correctors.

Figure 1A:
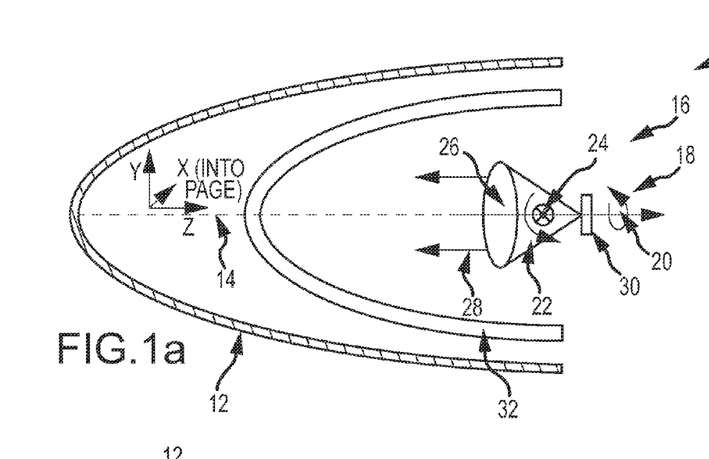
FIGS. 1a-1d are side, bottom, end-on and perspective views of a conformal dome roll/nod seeker with arch corrector optics mounted on the roll gimbal.
Figure 1B:
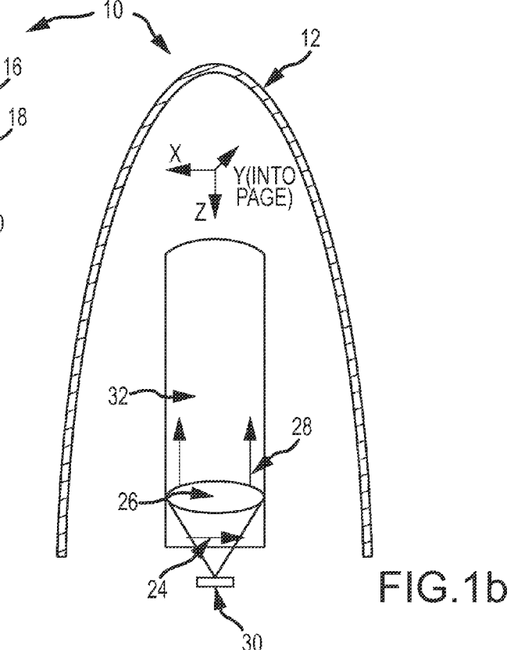
Figure 1C:
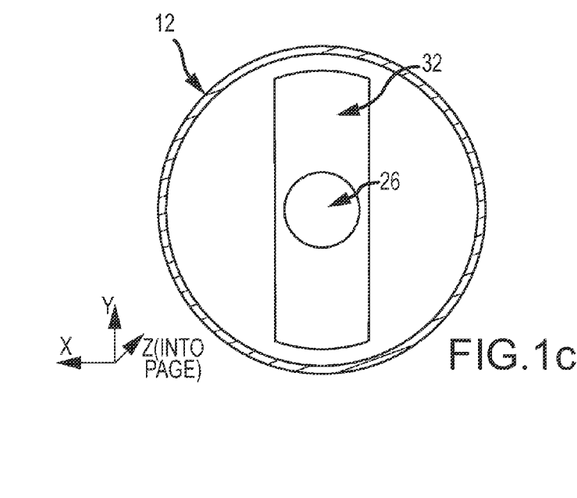
Figure 1D:
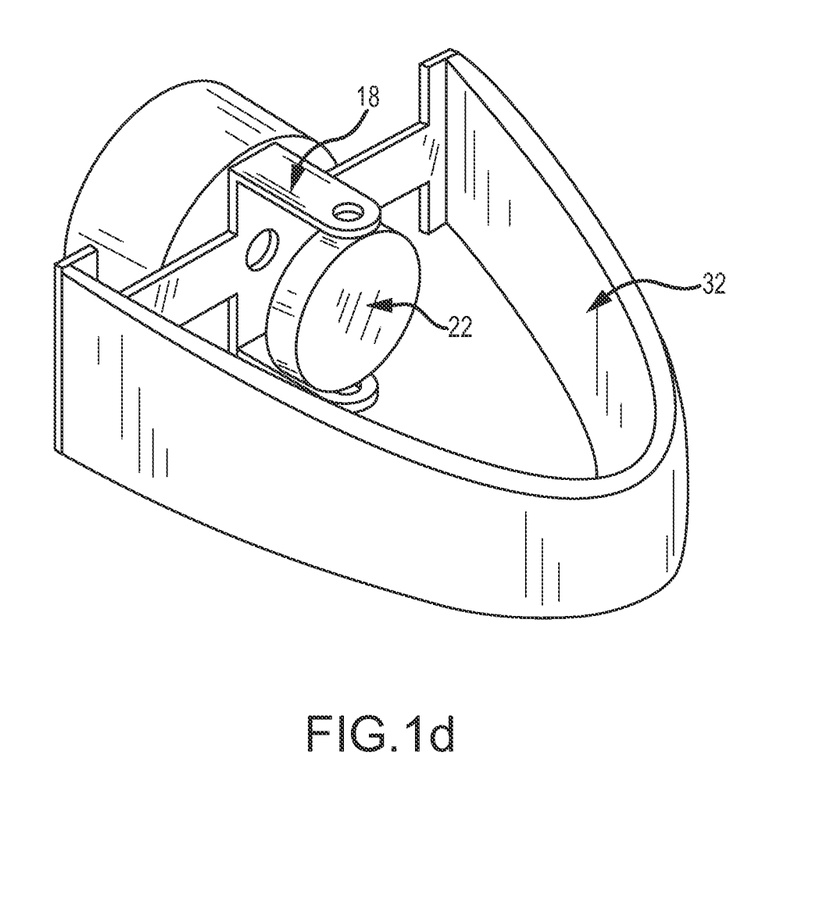

Without loss of generality, an embodiment of the asymmetric rotating baffles will be described in the context of a roll/nod seeker provided with an arch corrector optic. Portions of the optical systems are simplified for clarity. For example, the receiver optics are illustrated as comprising a single optical element although typically the receiver optics will comprise multiple different lenses and mirrors. The sensor may be positioned either on or off gimbal. The gimbals are not shown (except in FIG. 1d) but are illustrated with rotational arrows about the respective roll and nod axis.

As shown in FIGS. 1a through 1d, an optical system 10 (sans the asymmetric rotating stray light baffles) comprises a conformal dome 12 that is symmetric about an axis of symmetry 14. A roll/nod seeker 16 positioned behind the dome comprises a roll gimbal 18 that rotates around a roll axis 20 coincident with the axis of symmetry 14, a nod gimbal 22 on the roll gimbal that rotates around a nod axis 24 orthogonal to the roll axis at the gimbal center to point an optical axis in a multi-dimensional space defined by said first and second axes, receiver optics 26 on the nod gimbal that receive optical radiation in a field-of-view (FOV) 28 along the optical axis and a sensor 30 optically coupled to the receiver optics. The seeker slews the FOV over a field-of-regard (FOR) such as a hemisphere. An optical corrector comprising an aspheric transparent arch 32 having an optical corrector shape responsive to a shape of the dome is mounted on the roll gimbal 18 within an optical path between the dome and the receiver optics as the seeker slews. As the arch rotates with the roll gimbal, the transparent arch is suitably designed to just cover the FOV over all allowed nods of the nod gimbal. An embodiment of the transparent arch 32 is described in detail in U.S. Pat. No. 6,028,712 with specific reference to FIGS. 3A-3C, which is hereby incorporated by reference.

Figure 2A:
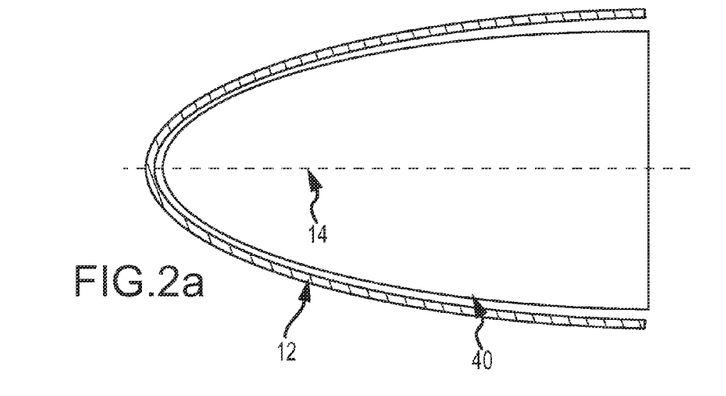
Figure 2B:
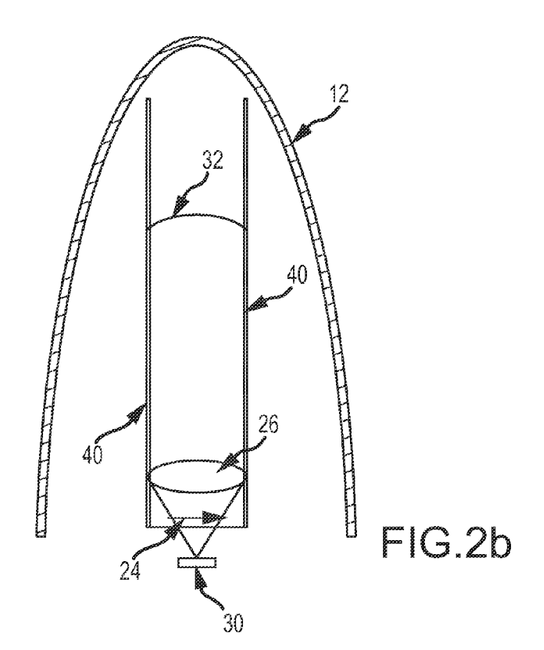
Figure 2C:
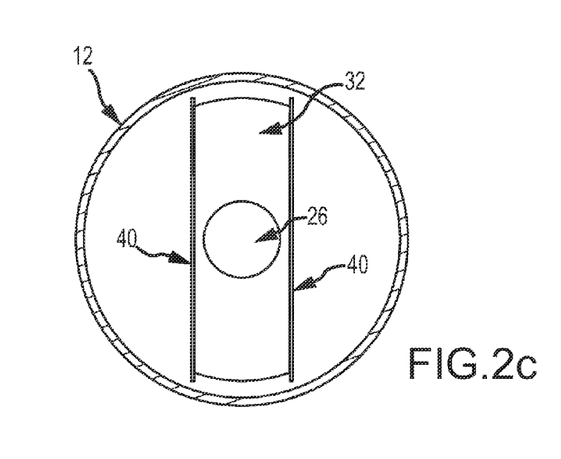

As shown in FIGS. 2a through 2c, a pair of side skirt baffles 40 are mounted on opposite sides of the transparent arch 32 on roll gimbal 18 to at least cover the sides of the arch. The side skirt baffles suitably extending forward beyond the transparent arch adjacent but not touching the inner surface of the dome 12 and extending aft beyond the forward most receiver optic 26 for all fields of regard (FOR). Because of the symmetry constraints, the skirt baffles may rotate and stay very near but not touching the inner surface of the dome. The skirt baffles are shaped by taking a planar section of a solid body having the shape of the conformal dome at the positions of the skirt on either side of the arch. The skirt baffles are preferably formed from a lightweight material e.g. plastic that is painted optically black in the spectral band(s) of the detector. The skirt baffles may be attached to the arch itself. The side skirts rotate (roll) with the arch. These baffles do not interfere with the optical path of scene light rays and thus do not obscure the aperture of the receiver optics and sensor at any position in the FOR. The skirt baffles prevent stray light from external sources far from the nod axis to enter the FOV. These baffles also prevent paths that would otherwise bypass the arch corrector after entering the dome.

Figure 3A:
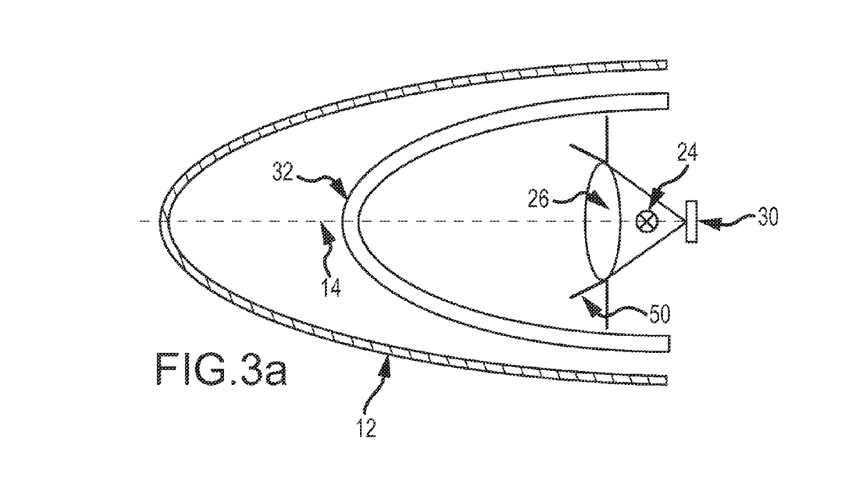
FIGS. 3a-3c are side, bottom and end-on views of an embodiment of objective baffles mounted on the receiver optic on the nod gimbal just outside the receiver optic's FOV.
Figure 3B:
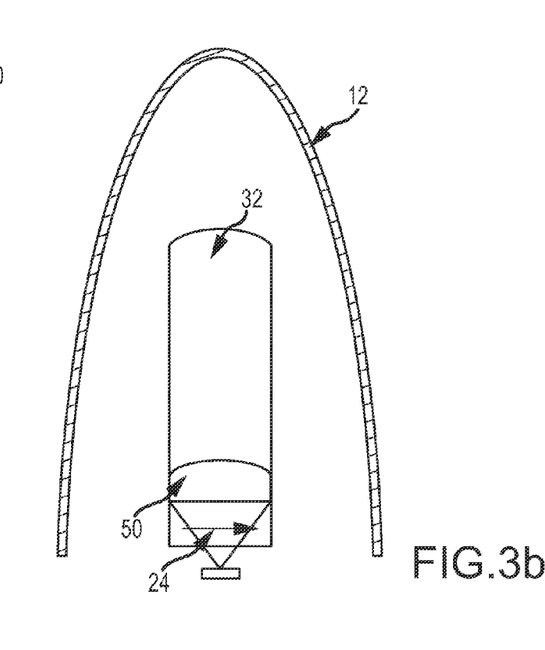
Figure 3C:
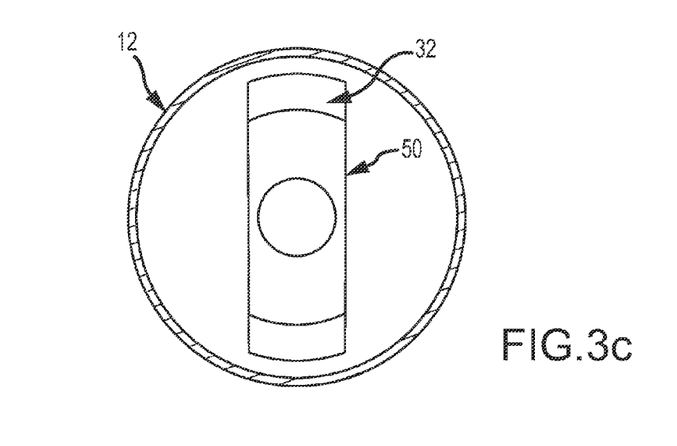
Figure 7A:
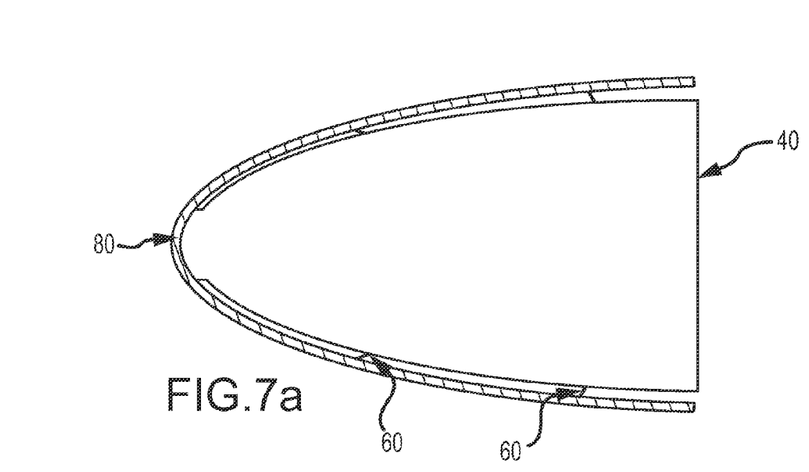
FIGS. 7a-7c are side, bottom and end-on views of an all-up embodiment of side skirt, objective, fin and central baffles for the conformal dome.
Figure 7B:
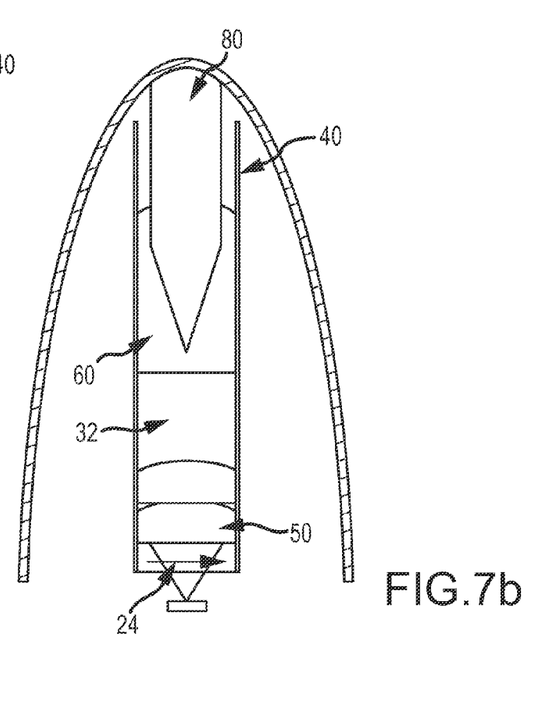
Figure 7C:
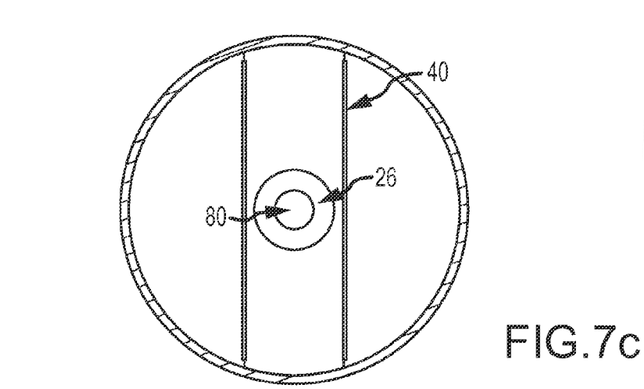

As shown in FIGS. 3a through 3c, an annular objective baffle 50 is mounted on and around the receiver optic 26 on the nod gimbal and between the pair of side skirt baffles (not shown in this view, shown in the all-up embodiment of FIGS. 7a-7c). The objective baffle suitably extends forward of the receiver optics as far as possible without interfering with the receiver optics' FOV and without interfering with the transparent arch as the gimbal nods over all positions. The ends of the objective baffle suitably have a complementary curvature to and the same width as the transparent arch. The baffles may extend straight forward as a cylinder or be flared out as a cone. The objective baffles do not interfere with or obscure the scene light rays and aperture. The objective baffles are suitably formed of a light-weight material that is optically black in the band of interest and may block stray light paths that are present at large angles in the FOR that enter through the opposite side of the dome (opposite the nod direction) traveling through the arch corrector and reflect off the surfaces of the dome or arch corrector into the aperture.

Figure 4A:
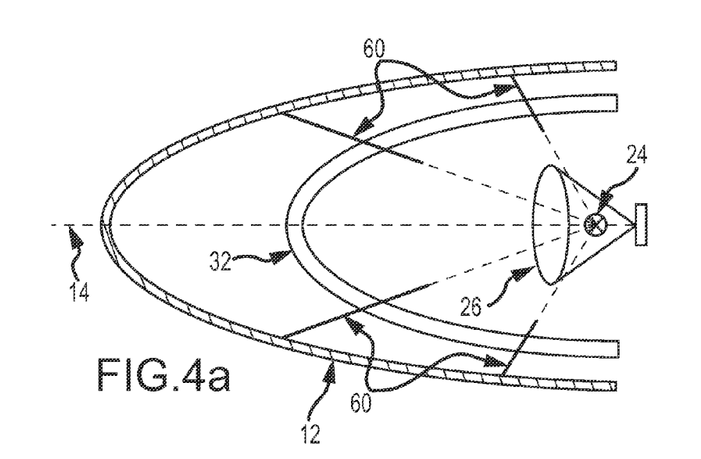
FIGS. 4a-4c are side, bottom and end-on views of an embodiment of fin baffles mounted through the arch corrector on the roll gimbal.
Figure 4B:
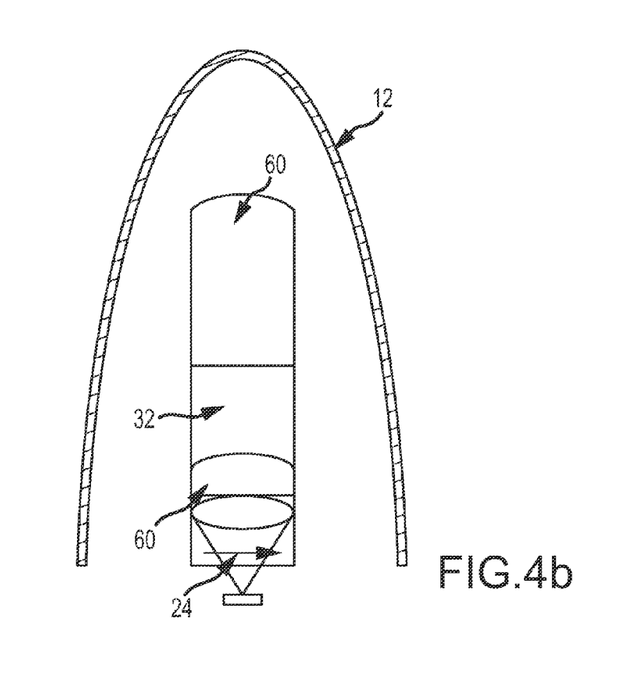
Figure 4C:
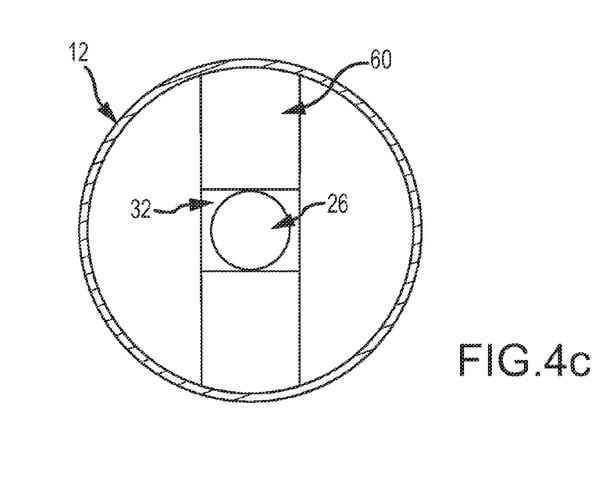

As shown in FIGS. 4a through 4c, a plurality of fin baffles 60 are mounted on the roll gimbal that extend forward adjacent but not touching the inner surface of the dome 12 and aft of the transparent arch 32. The fin baffles could be mounted to the arch 32 or sandwiched between side skirt baffles. Each fin baffle is positioned to reduce the cross-section seen by the receiver optic 26 when nodded in the direction of that fin baffle. As shown, the fin baffles are flat baffles which if extended intersect along nod axis 24. Alternately, the fin baffles could be conic sections which if extended intersect at the gimbal center. In both cases, these intersection conditions are preferred but not required. The fin baffles are suitably the same width as arch 32. The fin baffles may as shown pass through transparent arch 32. Alternatively, the fin baffles may extend from either side of the arch. The ends of the fin baffles suitably have a complementary curvature to the inner surface of the dome. The fin baffles suitably provide the majority of stray light suppression. The level of suppression is a function of how many baffles are added. Unlike the skirt and objective baffles, the fin baffles do interfere with scene light rays and the aperture. Thus, the fin baffle design is a tradeoff of stray light suppression versus aperture obscuration.

Figure 5A:
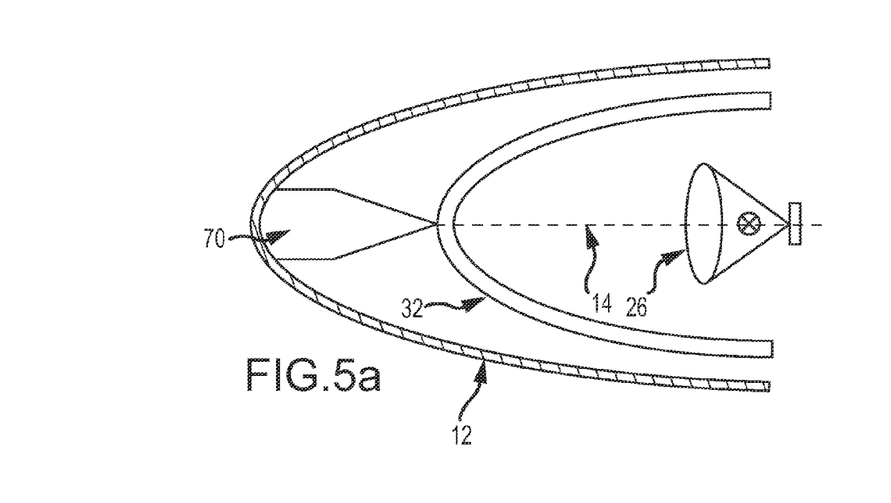
FIGS. 5a-5c are side, bottom and end-on views of an embodiment of short central baffles mounted on the conformal dome along the dome axis of symmetry.
Figure 5B:
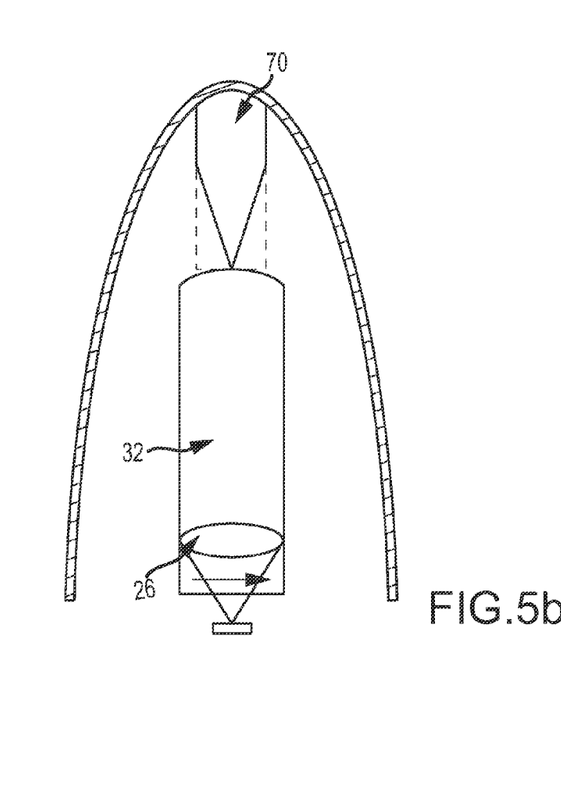
Figure 5C:
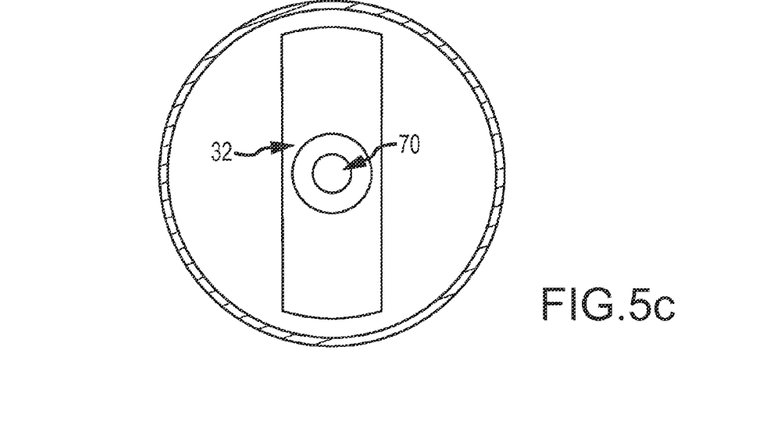
Figure 6A:
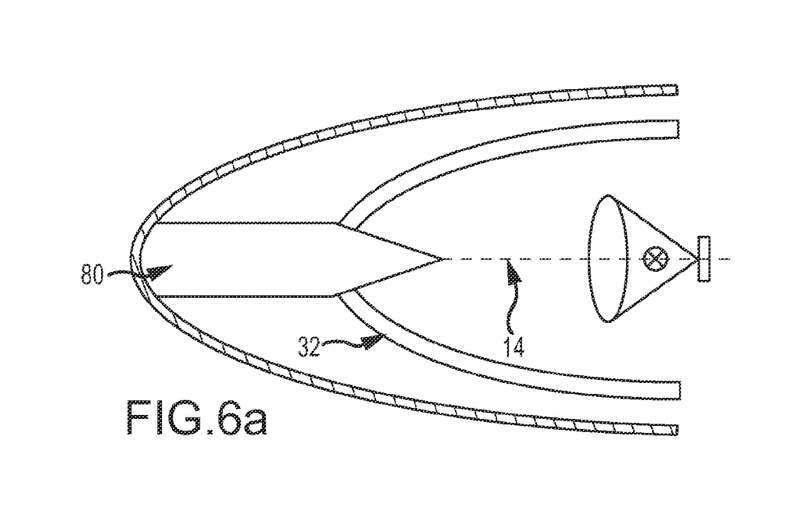
FIGS. 6a-6c are side, bottom and end-on views of an embodiment of long central baffles mounted on the arch corrector optics along the dome axis of symmetry.
Figure 6B:
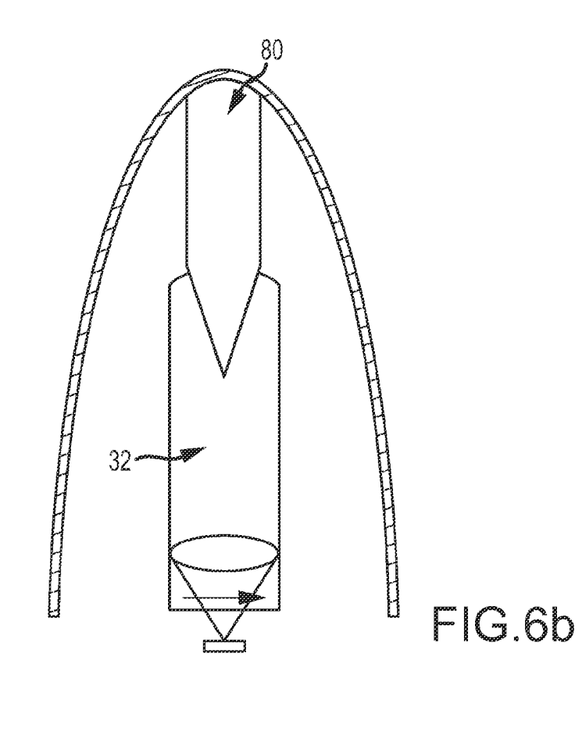
Figure 6C:
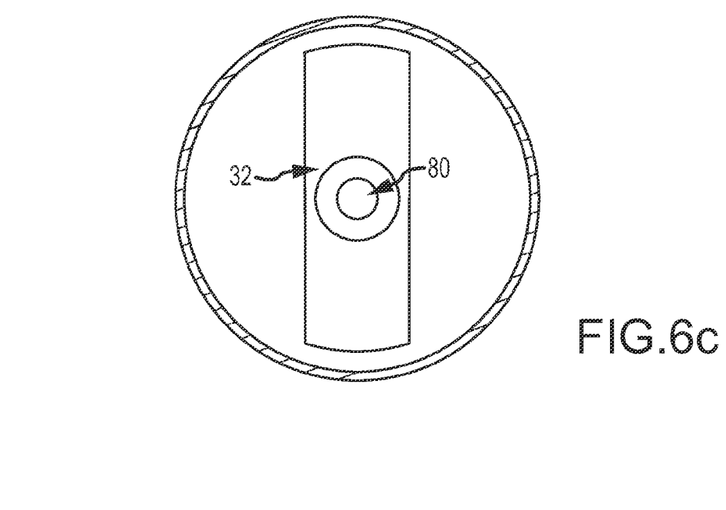

For a conformal dome, the rays tend to "focus" along the axis of symmetry of the dome. Often the central region near the point of the dome is not used by the optical path, it is hard to manufacture the point and it may need to be metalized for aerothermal reasons. As shown in FIGS. 5a through 5c, short central baffles 70 are positioned along the axis of symmetry 14 that obscure a portion of the receiver optics' aperture at a zero degree nod angle relative to the dome axis of symmetry. Because this portion may be unused the effective loss of aperture may be minimal. The end of the baffle may be tapered to a line or a point as shown to reduce obscuration as the receiver optic 26 is nodded slightly off center. Alternately, the baffle may not taper as depicted by the dashed line. The short central baffle 70 may be bonded to the dome 12 (in which case it would be stationary), bonded to the transparent arch 32, or attached to the side skirts via a fin baffle (the later two would require the baffle to roll with the correctors). The short central baffles extend to approximately the top of transparent arch 32. As shown in FIGS. 6a through 6c, long central baffles 80 are positioned along the axis of symmetry 14 that obscure a portion of the receiver optics' FOV at a zero degree nod angle. The long central baffles extend through and aft of transparent arch 32 and may taper to a line or point. The long central baffles exhibit the same obscuration of the aperture at zero nod angle but larger obscuration for small nod angles. The long central baffles will block additional stray light rays that are focused along the axis of symmetry further from the point of the dome.

An embodiment of an all-up design is illustrated in FIGS. 7a through 7c including a pair of side skirts 40 mounted on the roll gimbal on opposite sides of transparent arch 32, objective baffles 50 mounted on the nod gimbal on receiver optic 26, a plurality of fins 60 sandwiched between side skirts 40 that if extended intersect along nod axis 24 and a long central baffle 80 mounted along the axis of symmetry. Other embodiments may include the pair of side skirts and one or more of the objective, fin or central baffles.

Figure 8A:
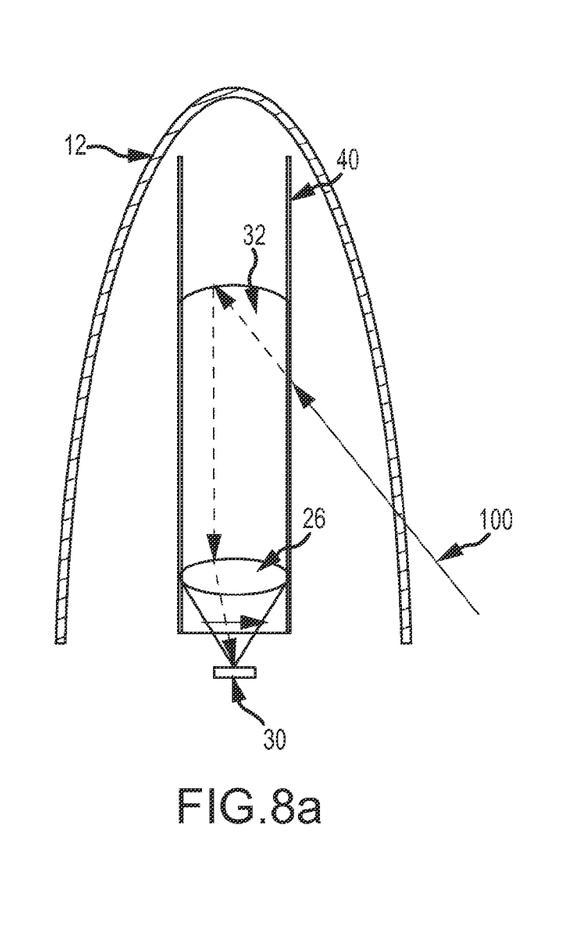
FIGS. 8a-8d are diagrams of stray light being blocked by skirt, long central, fin and objective baffles, respectively.
Figure 8B:
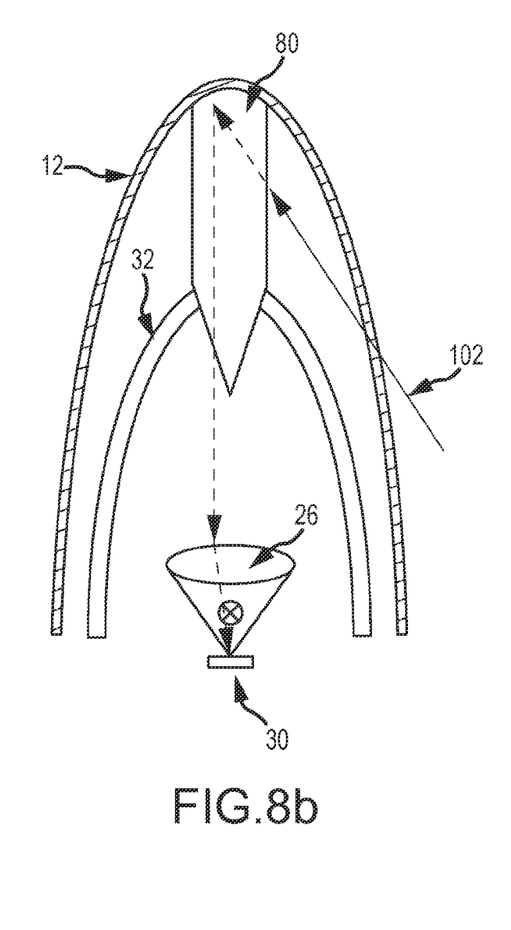
Figure 8C:
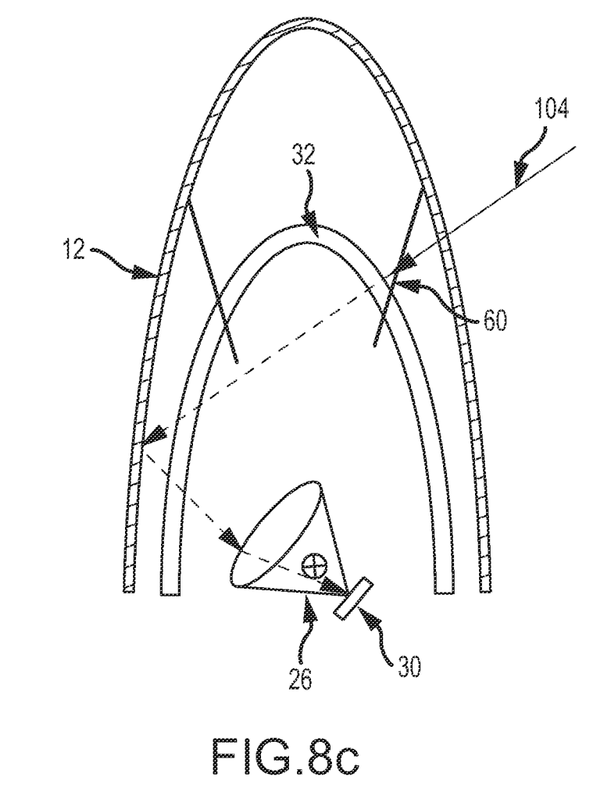
Figure 8D:
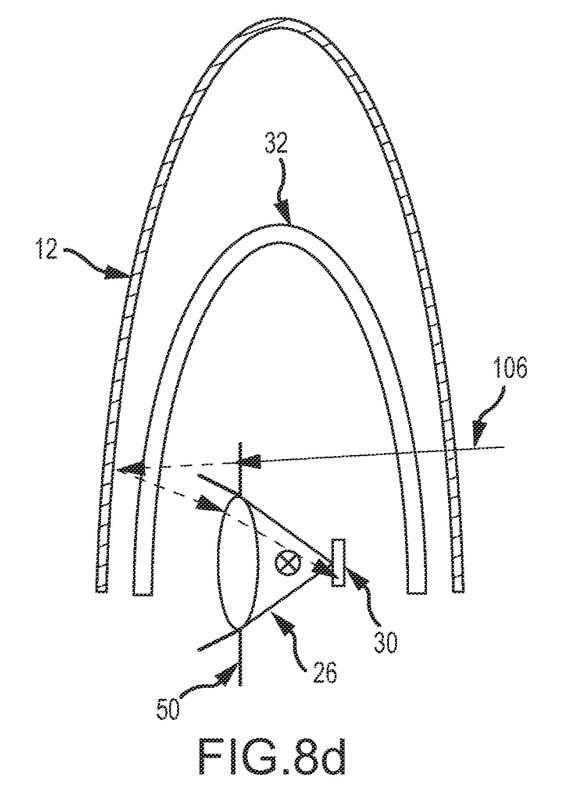

Examples of stray light paths that are obscured by the different asymmetric rotating baffles are depicted in FIGS. 8a through 8d. The stray light rays are indicated as solid lines. The extension of the stray light rays that would, absent the baffles, make their way into the aperture of receiver optic 26 and sensor 30 are indicated as dashed lines. As shown in FIG. 8a, a stray light ray 100 enters through dome 12 and reflects off of the underside of transparent arch 32 into the aperture of receiver optic 26. This ray is intercepted and absorbed by one of the side skirts 40. As shown in FIG. 8b, a stray light ray 102 enters through dome 12 and reflects off of the inner surface of the dome into the aperture of receiver optic 26. Long central baffles 80 intercept and absorb the ray. As shown in FIG. 8c, a stray light ray 104 enters through dome 12, passes through transparent arch 32 and reflects off of the inner surface of the side of the dome into the aperture of receiver optic 26. A fin 60 intercepts and absorbs the ray. As shown in FIG. 8d, a stray light ray 106 enters through dome 12 and reflects off of the inner surface of the dome into the aperture of receiver optic 26. Objective baffles 50 intercept and absorb the ray.

Figure 9A:
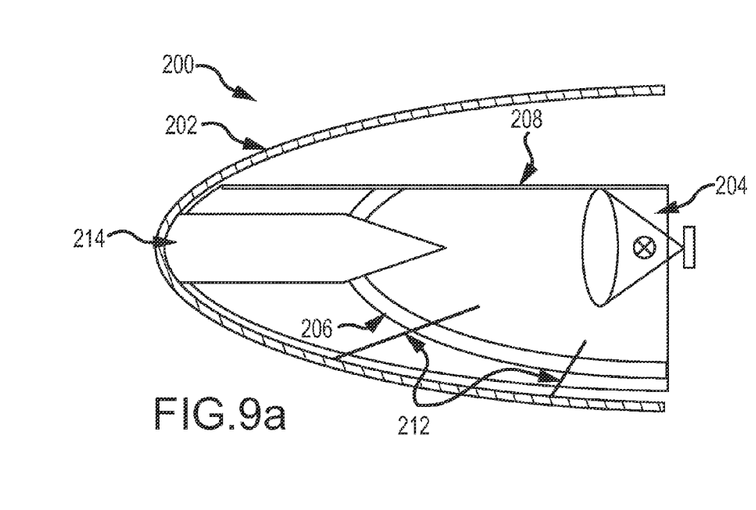
FIGS. 9a-9c are side, bottom and end-on views of an embodiment of baffles for a half-arch corrector optic.
Figure 9B:
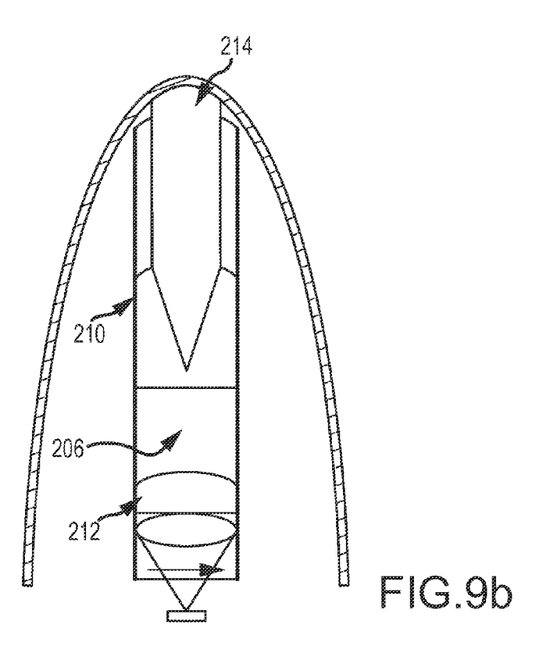
Figure 9C:
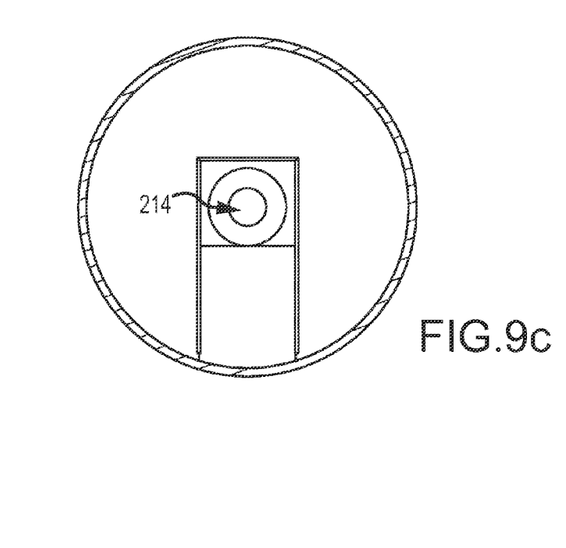

An optical system 200 including a conformal dome 202 and roll/nod seeker 204 fitted with a "half-arch" corrector 206 is illustrated in FIGS. 9a through 9c. The "half-arch" corrector 206 typically comprises somewhat more than one-half of an arch corrector so that at the 0 degree nod position the FOV is not obscured. The "half-arch" system can cover the same FOR as the "arch" system but must perform additional roll maneuvers to do so.

A more particular definition of an embodiment of the "half-arch" corrector is provided in U.S. Pat. No. 6,310,730, which is hereby incorporated by reference. The roll/nod gimbal can point the optical axis along plurality of directions including a z-axis lying perpendicular to a reference plane having orthogonal x and y axes lying therein. The optical corrector comprises a transparent body having an optical corrector shape responsive to a shape of the dome and which is bilaterally symmetric about the z axis in a yz cross section and not bilaterally symmetric about the z axis in an xz cross section.

A benefit of the half-arch configuration is that the arch corrector is smaller and thus lighter weight and the prescription does not have to be symmetric for either side of the node. Furthermore, the missing side of the arch is replaced with a half arch baffle 208 suitably as wide as arch 206 and suitably extending up to but not touching the inner surface of dome 202. Half arch baffle 208 is suitably sandwiched between side skirt baffles 210 (shown in transparency) on opposite sides of the half-arch corrector 206. The side skirt baffles suitably terminate at the half arch baffle 208. The half-arch configuration and half arch baffle 208 eliminate the need for fin baffles on the missing side. Fin baffles 212 are positioned between the side skirt baffles 210 on the remaining side of the half-arch as previously described. Central baffles 214 are positioned along the axis of symmetry to intercept stray light that is focused along that axis. The inclusion of half arch baffles 208 likely eliminates the need for objective baffles.

Figure 10A:
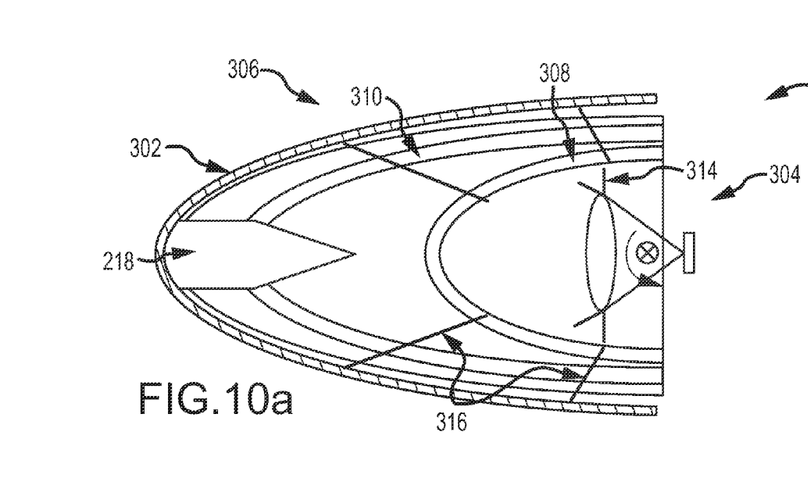
FIGS. 10a-10c are side, bottom and end-on views of an embodiment of baffles for a multi-arch corrector optic.
Figure 10B:
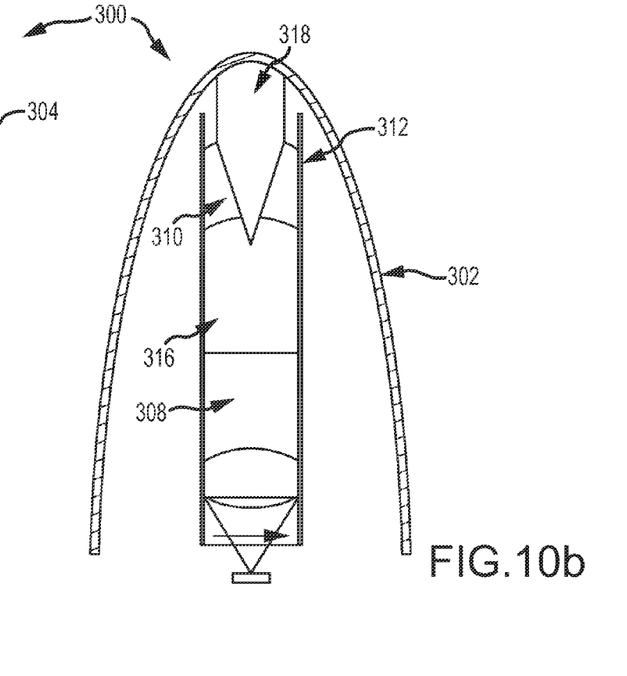
Figure 10C:
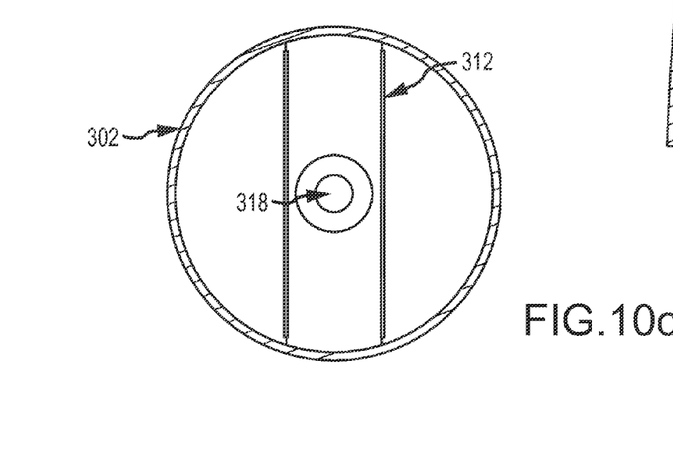

An optical system 300 including a conformal dome 302 and roll/nod seeker 304 fitted with a "multi-arch" corrector 306 is illustrated in FIGS. 10a through 10c. The "multi-arch" corrector 306 comprises a pair of transparent arches 308 and 310 that are each mounted on the roll gimbal and preferably just wide enough to cover the receiver optic FOV as the seeker nods over all FOR. Depending on the shape of the conformal dome 302 and the optical performance specification it may be necessary to provide two arch correctors to meet the specification. The additional reflective surfaces complicate the stray light issues. That said the same asymmetric rotating baffles described for the "arch" and "half-arch" configurations apply. A pair of side skirt baffles 312 (shown transparent in FIG. 10a to reveal the other baffles) is mounted on the roll gimbal on opposite sides of both arches. The side skirt baffles extend aft past the forward most receiver optic at its most extreme nod angle and forward past the outer arch adjacent but not touching the inner surface of the dome. Objective baffles 314 are mounted on the receiver optic on the nod gimbal and extend outward as far as possible without interfering with inner arch 308. Fin baffles 316 are sandwiched between the skirt baffles and preferably extend through both the inner and outer arches. Long central baffles 318 are positioned on the axis of symmetry and extend through outer arch 310.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An optical system, comprising:
  a non-spherical dome that is symmetric about an axis of symmetry;
  a two-axis seeker comprising,
    an outer gimbal that rotates around a first axis, said dome axis of symmetry coincident with said outer gimbal first axis;
    an inner gimbal on the outer gimbal, said inner gimbal rotating around a second axis to point an optical axis in a multi-dimensional space defined by said first and second axes;
    receiver optics on the inner gimbal that receive optical radiation in a field-of-view (FOV) along the optical axis; and
    a sensor optically coupled to the receiver optics;
  an optical corrector comprising an aspheric transparent arch having an optical corrector shape responsive to a shape of the dome, said arch mounted on the outer gimbal within an optical path between the dome and the receiver optics as the seeker slews;
  a pair of side skirt baffles mounted on opposite sides of the transparent arch on the outer gimbal, said side skirt baffles covering the sides of the transparent arch; and
  an annular objective baffle mounted on and around the receiver optics on the inner gimbal and between the pair of side skirt baffles, said objective baffle extending forward of or radially from the receiver optics without interfering with the receiver optics' FOV and without interfering with the transparent arch as the inner gimbal rotates.

2. The optical system of claim 1, wherein the optical corrector comprises a single arch, two or more arches or a half-arch.

3. The optical system of claim 2, wherein the transparent arch is bilaterally symmetric or asymmetric but not rotationally symmetric.

4. The optical system of claim 1, wherein the side skirt baffles extend forward beyond the transparent arch adjacent but not touching the inner surface of the dome.

5. The optical system of claim 1, wherein the side skirt baffles extend aft beyond the forward most receiver optic for all fields of regard (FOR).

6. The optical system of claim 1, wherein the side skirt baffles are attached to the transparent arch.

7. The optical system of claim 1, wherein the ends of the objective baffle have a complementary curvature to the transparent arch.

8. The optical system of claim 1, wherein the objective baffles has the same width as the transparent arch.

9. An optical system, comprising:
  a non-spherical dome that is symmetric about an axis of symmetry;
  a two-axis seeker comprising,
    an outer gimbal that rotates around a first axis, said dome axis of symmetry coincident with said outer gimbal first axis;
    an inner gimbal on the outer gimbal, said inner gimbal rotating around a second axis to point an optical axis in a multi-dimensional space defined by said first and second axes;
    receiver optics on the inner gimbal that receive optical radiation in a field-of-view (FOV) along the optical axis; and
    a sensor optically coupled to the receiver optics;
  an optical corrector comprising an aspheric transparent arch having an optical corrector shape responsive to a shape of the dome, said arch mounted on the outer gimbal within an optical path between the dome and the receiver optics as the seeker slews;
  a pair of side skirt baffles mounted on opposite sides of the transparent arch on the outer gimbal, said side skirt baffles covering the sides of the transparent arch; and
  a plurality of fin baffles mounted between the side skirt baffles on the outer gimbal that extend fore and aft of the transparent arch, each said fin baffle positioned to reduce the cross-section seen by the receiver optic when rotated around the second axis in the direction of that fin baffle.

10. The optical system of claim 9, wherein the fin baffles are flat baffles which if extended intersect along the second axis.

11. The optical system of claim 9, wherein the fin baffles are conic sections which if extended intersect along the second axis.

12. The optical system of claim 9, wherein the fin baffles pass through the transparent arch.

13. The optical system of claim 9, wherein the fin baffles extend forward adjacent but not touching the inner surface of the dome.

14. The optical system of claim 13, wherein the ends of the fin baffles have a complementary curvature to the dome or transparent arch.

15. An optical system, further comprising:
   a non-spherical dome that is symmetric about an axis of symmetry;
   a two-axis seeker comprising,
      an outer gimbal that rotates around a first axis, said dome axis of symmetry coincident with said outer gimbal first axis;
      an inner gimbal on the outer gimbal, said inner gimbal rotating around a second axis to point an optical axis in a multi-dimensional space defined by said first and second axes;
      receiver optics on the inner gimbal that receive optical radiation in a field-of-view (FOV) along the optical axis; and
      a sensor optically coupled to the receiver optics;
   an optical corrector comprising an aspheric transparent arch having an optical corrector shape responsive to a shape of the dome, said arch mounted on the outer gimbal within an optical path between the dome and the receiver optics as the seeker slews;
   a pair of side skirt baffles mounted on opposite sides of the transparent arch on the outer gimbal, said side skirt baffles covering the sides of the transparent arch; and
   central baffles along the axis of symmetry that obscure a portion of the receiver optics' aperture for all or a part of the FOV at and near a zero degree rotation angle around the second axis.

16. The optical system of claim 15, wherein the central baffle is fixed to the inner surface of the dome.

17. The optical system of claim 15, wherein the central baffle is fixed to the transparent arch.

18. The optical system of claim 15, wherein an aft end of the central baffles are tapered.

19. An optical system, comprising:
   a non-spherical dome that is symmetric about an axis of symmetry;
   a two-axis seeker comprising,
      an outer gimbal that rotates around a first axis, said dome axis of symmetry coincident with said outer gimbal first axis;
      an inner gimbal on the outer gimbal, said inner gimbal rotating around a second axis to point an optical axis in a multi-dimensional space defined by said first and second axes;
      receiver optics on the inner gimbal that receive optical radiation in a field-of-view (FOV) along the optical axis; and
      a sensor optically coupled to the receiver optics;
   an optical corrector comprising an aspheric transparent arch having an optical corrector shape responsive to a shape of the dome, said arch mounted on the outer gimbal within an optical path between the dome and the receiver optics as the seeker slews;
   asymmetric rotating stray light baffles, comprising:
      a pair of side skirt baffles mounted on opposite sides of the transparent arch on the outer gimbal, said side skirt baffles extending forward beyond the transparent arch adjacent but not touching the inner surface of the dome and extending aft beyond the forward most receiver optic for all fields of regard (FOR);
      an annular objective baffle mounted on and around the receiver optics on the inner gimbal and between the pair of side skirt baffles, said objective baffle extending forward of the receiver optics without interfering with the receiver optics' FOV and without interfering with the transparent arch as the gimbal rotates around the second axis; and
      a plurality of fin baffles mounted between the side skirt baffles on the outer gimbal that extend forward adjacent but not touching the inner surface of the dome and aft of the transparent arch, each said fin baffle positioned to reduce the cross-section seen by the receiver optic when rolled in the direction of that fin baffle.

20. An optical system, comprising:
   a non-spherical dome that is symmetric about an axis of symmetry;
   a two-axis seeker comprising,
      an outer gimbal that rotates around as first axis, said dome axis of symmetry coincident with said outer gimbal first axis;
      an inner gimbal on the outer gimbal, said inner gimbal rotating around a second axis to point an optical axis in a multi-dimensional space defined by said first and second axes;
      receiver optics on the inner gimbal that receive optical radiation in a field-of-view (FOV) along the optical axis; and
      a sensor optically coupled to the receiver optics;
   an optical corrector comprising an aspheric transparent arch having an optical corrector shape responsive to a shape of the dome, said arch mounted on the outer gimbal within an optical path between the dome and the receiver optics as the seeker slews;
   asymmetric rotating stray light baffles, comprising:
      a pair of side skirt baffles mounted on opposite sides of the transparent arch on the outer gimbal, said side skirt baffles extending forward beyond the transparent arch adjacent but not touching the inner surface of the dome and extending aft beyond the forward most receiver optic for all fields of regard (FOR), and at least one of,
      an annular objective baffle mounted on and around the receiver optics on the inner gimbal and between the pair of side skirt baffles, said objective baffle extending forward of the receiver optics without interfering with the receiver optics' FOV and without interfering with the transparent arch as the inner gimbal rotates;
      a plurality of fin baffles mounted between the side skirt baffles on the router gimbal that extend forward adjacent but not touching the inner surface of the dome and aft of the transparent arch, each said fin baffle positioned to reduce the cross-section seen by the receiver optic when rotated in the direction of that fin baffle; and
      central baffles along the axis of symmetry that obscure a portion of the receiver optics' FOV at a zero degree angle of rotation about the second axis.

* * * * *